United States Patent [19]

Kosaka et al.

[11] 4,045,353

[45] Aug. 30, 1977

[54] HIGH-ENERGY RADIATION INDUCED POLYMERIZATION ON A CHROMATOGRAPHIC SOLID SUPPORT

[75] Inventors: Yujiro Kosaka, Shin-nanyo; Masaru Uemura, Yokohama; Tsutomu Hashimoto; Kazuyuki Fukano, both of Shin-nanyo, all of Japan

[73] Assignee: Toyo Soda Manufacturing Co., Ltd., Japan

[21] Appl. No.: 543,800

[22] Filed: Jan. 24, 1975

[30] Foreign Application Priority Data

Oct. 15, 1974 Japan .................................. 49-118374

[51] Int. Cl.$^2$ ..................... B01D 39/00; B01D 39/14
[52] U.S. Cl. ..................................... 210/502; 55/386; 210/198 C; 427/36; 427/44
[58] Field of Search ................. 210/31, 31 C, 198 C, 210/24 C, 502; 55/67, 197, 386; 117/161 UZ, 161 UT, 161 UH; 427/36, 44

[56] References Cited

U.S. PATENT DOCUMENTS

| | | | |
|---|---|---|---|
| 3,347,020 | 10/1967 | Van Venrooy | 55/67 |
| 3,458,976 | 8/1969 | Hollis | 55/386 |
| 3,663,263 | 5/1972 | Bodre | 210/198 C |
| 3,722,181 | 3/1973 | Kirkland | 210/198 C |
| 3,795,313 | 3/1974 | Kirkland | 210/198 C |
| 3,808,125 | 4/1974 | Good | 210/198 C |

*Primary Examiner*—Frank W. Lutter
*Assistant Examiner*—Frank Sever
*Attorney, Agent, or Firm*—Oblon, Fisher, Spivak, McClelland & Maier

[57] ABSTRACT

A chromatography solid support which is prepared by immersing a microporous inorganic substrate in a radiation-polymerizable monomer and subjecting said monomer to high energy radiation to produce a radiation-induced polymerization of the polymerizable monomer is disclosed.

12 Claims, No Drawings

HIGH-ENERGY RADIATION INDUCED POLYMERIZATION ON A CHROMATOGRAPHIC SOLID SUPPORT

BACKGROUND OF THE INVENTION

1. Field of the Invention

The present invention relates to a chromatography solid support.

2. Description of the Prior Art

Chromatography solid supports are classifiable as liquid chromatography solid support or gas chromatography solid supports. The liquid chromatography solid supports include inorganic supports, e.g., silica, alumina, and diatomaceous earth. In order to meet the requirements of high speed liquid chromatography, solid supports having cores coated with a porous silica surface and solid supports coated or chemically bonded with an organic compound or organic polymer gel have been widely used. For partition chromatography, solid supports prepared by coating or chemically bonding an organic compound or an organic polymer gel onto a porous surface substrate have been employed. These solid supports have excellent separability. However, they have the following disadvantages. The solid supports formed by coating or chemically bonding an organic compound onto a porous substrate require a precolumn to prevent the bleeding-out of the organic compound. Additionally, both the number of media suitable for use as the mobile phase and the types of materials which can be chemically bonded may be limited. Also, these solid supports have small specific surface areas and accordingly the load of the sample which can be accommodated is restricted.

On the other hand, a refractory brick powder containing a main component of diatomaceous earth as a stationary solid support which is coated with a stationary liquid compound or a polymer gel has been used as a partition chromatography solid support. The solid supports prepared by coating a stationary phase on celite or brick powder possess the advantage that numerous types of suitable stationary phase liquids exist, thereby facilitating the selection of a stationary phase liquid for a specific sample. However, in this case, the stationary phase liquid is easily bled-out whereby the bleeding disadvantageously occurs in cases where a highly sensitive detector or high temperature is employed. It would be very desirable to have a chromatography solid support free from the aforementioned disadvantages.

SUMMARY OF THE INVENTION

Accordingly, it is one object of the present invention to provide a chromatography solid support which has high separation ability and does not swell easily so as to accommodate a high load of the sample, and which has high heat resistance and does not cause the elution of a polymer. This and other objects of the present invention which will hereinafter be made clear have been attained by immersing a micro-porous inorganic substrate in a polymerizable monomer in the presence or the absence of a crosslinking agent and inducing polymerization by the use of high energy ionizing radiation of the polymerizable monomer to form a micro-porous solid support having a radiation-induced polymerized layer. If desired, for speciality purposes, certain functional groups can be introduced onto the polymer of the layer.

DETAILED DESCRIPTION OF THE PREFERRED EMBODIMENTS

The solid support of the invention can be prepared by the following process. A radiation polymerizable monomer is absorbed onto a micro-porous inorganic substrate, which may be coated onto a core. The product is subsequently treated with ionic radiation in air, nitrogen or, if necessary, in vacuo. The micro-porous inorganic substrate should have an average specific surface area of 0.1 - 3000 m$^2$/g, preferably 70 - 1500 m$^2$/g, an average pore diameter of 20 - 2000 A, preferably 30 - 1000 A, and an average particle diameter of 1 $\mu$m - 1 cm. It is preferred to use a micro-porous inorganic substrate having an average particle diameter of 1 $\mu$m-1cm. (average particle diameter of 2 - 50 $\mu$m for liquid chromatography and average particle size of 30 - 120 mesh for gas chromatography). The microporous solid support having the radiation induced polymerized layer, which hereinafter will be simply referred to as the solid support, should have an average specific surface area of 1 - 2000 m$^2$/g, preferably 50 - 1000 m$^2$/g, an average pore diameter of 10 - 1900 A, preferably 20 - 1000 A. Hereinafter, the term "specific surface area" will be referred to as "specific area." Suitable inorganic solid substrates include silica, silica gel, alumina, diatomaceous earth (celite), zeolite, porous glass, carbon black, active carbon, clay, etc. Suitable porous inorganic substrates include:

| Inorganic substrate | Size ($\mu$m) | Specific surface area (m$^2$/g) |
|---|---|---|
| diatomaceous earth | 30 - 50 | 1 - 10 |
| silica gel | 1 | 200 - 600 |
| fine silica gel (white carbon) | 10 - | 100 - 300 |
| glass beads | 30 - 50 | ~1 |
| active carbon | — | 1000 - 3000 |
| carbon black | 1 - 500 | — |
| alumina | 10 - | 100 - 300 |

Suitable polymerizable monomers include the ethylenically unsaturated monomers such as styrene monomer, $\alpha$-methylstyrene, sodium styrenesulfonate; fluorine monomer, e.g., tetrafluoroethylene, vinylfluoride; silicon containing monomers, e.g., vinyltriethoxysilane; acrylates, e.g., methyl methacrylate; methacrylates, e.g., methyl methacrylate; other vinyl monomers, e.g. acrylonitrile, acrylamide, vinylpyrrolidone, vinylisocyanate, vinylchloride, sodium vinylsulfonate; olefin monomers, e.g., ethylene, isobutene; diene monomers e.g., butadiene, isoprene, 1,3-pentadiene, cyclopentadiene, chloroprene; or other monomers capable of being radiation polymerized, such as the aldehydes, e.g., propionaldehyde; ketones, e.g., bromoacetone; cyclic ethers, e.g., epichlorohydrine, cyclopenteneoxide, cyclohexeneoxide, arylglycidyl ether, vinyl ether; or the like. Additionally, a monomer can be selected to produce a polymer having certain desired functional groups. Such a polymer can be easily grafted on the substrate. This is one advantageous aspect of the solid support used in this invention. Since desirable functional groups can be introduced, the range of samples which are separatable by the products of this invention is quite large.

Suitable ionic radiant rays are $\beta$-rays, $\gamma$-rays, X-rays, or electron rays. The dose rate should be 10$^4$ - 10$^9$ r/hr and the total dose is preferably in the range of 0.1 Mr. to 50 Mr. When a polymer is grafted onto an inorganic substrate by radiation-induced polymerization, the amount of grafted polymer increases inversely with dose rate. Accordingly, it is preferable to employ low dose rates such as $10^4 - 10^5$ r/hr. The optimum total radiation dose will be dependent upon the type of monomer and dose rate used. A radiation-induced polymerizable monomer having a high G value can be polymerized with 100% conversion by a small total radiation dose. On the other hand, the total radiation dose required for polymerizing a monomer having a low G value with 100% conversion is high. In all cases, the total radiation dose should be designed to yield about 100% conversion of the monomer. Also, it is preferable to avoid a large excess of total radiation dose as this causes a degradation of the resulting polymer. For example, the optimum total radiation dose for polymerization of styrene is dependent upon the dose rate and is about 1 - 10 Mr. The radiation temperature range is usually from room temperature to about 50° C. The percent of grafted material will usually increase with an increase in temperature. However, some monomers which can be polymerized only by ionic polymerization can be polymerized only at lower than 0° C.

The solid supports which are treated by radiation-induced polymerization can be used for either liquid chromatography or gas chromatography. When they are used as liquid chromatography solid supports, any ungrafted polymer may be eluted during passage of a mobile phase medium. Accordingly, it is preferred to remove the ungrafted polymer by some medium before using the solid support. Thereby, all the remaining polymer will be chemically bound to the inorganic substrate so that there will be no difficulty with carrier being bled-out of the polymer during passage of any medium. On the other hand, when the solid support is used as a gas chromatography solid support, it also is preferred to remove the ungrafted polymer in order to prevent bleed-out at high temperatures and to improve heat resistance.

As stated above, the commercialized inorganic-organic composite solid supports are prepared by coating an organic compound onto an inorganic substrate or by chemically bonding the compound to the substrate, e.g., with an ester bond. When these are used for liquid chromatography, the number of suitable media for use as the carrier are disadvantageously limited because of the decomposition of the ester bond. When used for gas chromatography, the organic compound is disadvantageously bled-out. On the other hand, the solid support of this invention avoids these disadvantages. In general, a polymer which is partially not extracted by the solvent is produced, even when the polymerizable monomer is polymerized in the microporous inorganic substrate with a conventional initiator. However, the amount of polymer which is not extracted is quite small as compared to the case of radiation-induced polymerization. This occurs because when irradiation is used, many active sites are uniformly formed on the surface of the inorganic substrate and the resulting polymer is bonded to these active sites.

It is one of the features of the invention to enable easy grafting of a solid monomer.

A solid monomer such as acrylamide is difficult to polymerize using conventional initiators. However, it can be carried out by solid graft-polymerization; that is, acrylamide is dissolved in water and an inorganic substrate such as silica gel is added. Water is evaporated to adsorb acrylamide monomer on the surface of the inorganic substrate. Following radiation-induced polymerization of the absorbed acrylamide, an inorganic substrate grafted with polyacrylamide is produced.

In order to effectively separate the sample, it is necessary to select a proper amount of the graft polymer. When the amount of the polymer grafted on the inorganic substrate is too small, the sample cannot be effectively separated. When the amount of the polymer grafted onto the inorganic substrate is too large, the fine holes of the inorganic substrate are closed and again the sample cannot be effectively separated. The optimum amount of the grafted polymer is dependent upon the nature of the inorganic substrate. The optimum grafted amount is relatively high in the case of an inorganic substrate having a large specific surface area. On the other hand, the optimum grafted amount is relatively low in the case of an inorganic substrate having a small specific surface area. In general, the sample can be separated by using a solid support wherein more than 50% of the surface of the inorganic substrate is covered by the grafted polymer and all of the fine holes of the microporous inorganic substrate are not filled. This usually requires up to 6 - 7 times the amount in a monomolecular layer; that is, the sample can be separated with a load in the range of 0.5 A - 7A, wherein A represents the amount of monomer needed to cover the entire surface of the inorganic substrate with a monomolecular layer. The value of A is dependent upon the surface area of the inorganic substrate and the type of monomer. A can be obtained from the following equation:

$$A(g/\text{grams of inorganic substrate}) = \frac{S \times m}{a \times N} \quad (1)$$

wherein

S: specific area of inorganic substrate (m²g)
a: sectional area of one molecule of the monomer (A²)
m: molecular weight of the monomer
N: Avogadro's number.

Control of the graft polymerization is usually performed by selecting an adsorptability of the monomer, dose, irradiation time and reaction temperature, etc. These parameters will vary depending upon the monomer. Accordingly, the conditions must be determined selectively for each monomer. In general, the graft percentage increases with increase of adsorptability of the monomer, decrease of dose rate and increase of irradiation time. As stated above, the graft percentage increases with increase in reaction temperature (radiation temperature). The control of the grafted polymer can be easily performed by the following method:

A small amount of a cross-linking agent such as divinylbenzene is added to the monomer before the radiation-induced polymerization. The ungrafted polymer normally produced in the absence of the crosslinking agent becomes cross-linked in the presence of the cross-linking agent. The cross-linked polymer is produced by the addition of the crosslinking agent and is not substantially extracted during solvent extraction. The adsorbed monomer can be substantially grafted onto the inorganic substrate with 100% conversion. In accordance with this method, the control of the graft percentage can be performed by control of the amount of the monomer absorbed. The amount of the cross-linking agent added is preferably 1 - 10 wt.% of the monomer. The microporous solid support having a radiation-induced polymerized layer prepared by adding a crosslinking agent has the same separability and characteristics as those of a solid support prepared without any cross-linking agent, as shown in the examples. This is referred to as the simultaneous irradiation method. It is also possible to form the solid support of the invention by preparing active sites by irradiation of the inorganic substrate followed by contact of the monomer therewith. This is referred to as the pre-irradiation method. The resulting solid support is as useful as those prepared by the simultaneous irradiation method. The separability and other characteristics are the same.

As stated above, the solid support of the invention can be produced with a surface incorporating desirable functional groups by selecting an appropriate monomer used for the graft polymerization. However, when it is difficult to obtain graft polymerization of a monomer having a desirable functional group or to find a monomer having the desirable functional group, it is possible to prepare a solid support having the desirable functional group by a chemical reaction. This introduces the functional group into the grafted polymer yielded by the above-mentioned methods. For example, a chromatography solid support having an $SO_3H$ group can be prepared by graft-polymerization of styrene onto an inorganic substrate followed by sulfonation of the graft polymer. It is also possible to prepare a solid support by a graft-copolymerization of two or more comonomers simultaneously. The resultant solid support has separability and characteristics which are different from those of a solid support prepared by a graft-polymerization of each monomer.

In the case of a liquid chromatography solid support, higher separability is produced by a smaller sized and spherically shaped solid support than by use of a larger size and non-spherical shape. It is also preferable, in this invention, to use a spherical solid support having a diameter of 2 – 50 μm when high separability is required. On the other hand, in the case of a gas chromatography solid support, it is customary to use a large solid support having a size of 30 – 120 mesh. It is also preferable, in the case of the invention, to use a solid support having a size of 30 – 120 mesh, when high separability is required.

Among the monomers, styrene, methylmethacrylate, vinyl acetate, etc. are especially preferable because of easy radiation-induced polymerization. These monomers are liquid at room temperature whereby handling is easy. Polystyrene gel, polymethylmethacrylate gel and polyvinyl acetate gel are commercially available. The polymer-gel grafted solid support prepared by the radiation-induced polymerization of the invention has separability equal to that of the polymer gel itself and has a superior resistance to swelling. From this viewpoint, it is preferable to use styrene, methylmethacrylate, vinyl acetate, etc.

The molecular weight of the grafted polymer is higher than those of the ungrafted polymer (homopolymer) and the polymer produced by bulk polymerization. The molecular weight of the graft homopolymer is dependent upon the type of monomer employed and is usually in a range of $10^4 – 10^7$. For example, the weight average molecular weight (M) of grafter polystyrene is about $10^5 – 10^6$ and can be controlled mainly by the dose rate. The molecular weight can be decreased by increasing the dose rate or increased by decreasing the dose rate.

When a cross-linking agent is added, the grafted polymer is crosslinked.

The solid support of the invention has an inorganic substrate whereby it has excellent mechanical strength, high compressive resistance and high heat resistance. When the solid support of the invention is used as a liquid chromatography solid support, swelling of the solid support is low whereby dry packing and change of the medium can be freely performed. In order to demonstrate the effectiveness of the solid supports prepared by the radiation-induced polymerization as liquid chromatography solid supports, mechanical strength, heat resistance, life, medium selectivity and medium exchangeability of three partition (liquid) chromatography solid supports are shown in Table 1, wherein the symbol ○ designates good; Δ designates slightly bad and × designates bad.

Table 1

|  | Chemical bond (ester type) silica gel | Coating silica gel | Polymer gel | Radiation grafted inorganic substrate |
|---|---|---|---|---|
| mechanical strength | ○ | ○ | Δ | ○ |
| heat resistance | Δ | × | Δ | ○ |
| life | Δ | × | ○ | ○ |
| solvent selectivity | Δ | × | Δ | ○ |
| solvent exchangeability | Δ | × | Δ | ○ |

Note that the radiation grafted solid support has higher heat resistance than the polymer gel prepared by polymerizing the same monomer since the polymer is chemically bonded on the inorganic substrate.

When the solid support of the invention is used as a liquid chromatography solid support, the separability of the solid support is the same as that of a polymer gel which is prepared from the same monomer. Additionally, the solid support does not swell because of the presence of the inorganic substrate. The solid support of the invention has high specific surface area, whereby the load of the sample can be increased. Also, since the polymer is chemically bonded to the inorganic substrate, the polymer is not dissolved in the medium whereby the type of the medium is not limited. These are some of the advantages of the solid support of the invention.

On the other hand, when the solid support is used as a gas chromatography support, the separability is the same as that of the polymer gel prepared from the same monomer and the polymer is chemically bonded to the inorganic substrate, whereby the heat resistance is higher than that of the polymer gel. There is no problem with bleed-out as occurs in the case of the solid support coated with a stationary phase liquid.

Having generally described the invention, a more complete understanding can be obtained by reference to certain specific examples, which are included for purposes of illustration only and are not intended to be limiting unless otherwise specified.

EXAMPLE 1

8 g of styrene monomer was adsorbed on 10 g of silica gel (specific area of 330 m²/g; average diameter of 20 – 25 μm), and μ- rays from a source of cobalt 60 were irradiated on the mixture at a dose rate of $10^5$ r/hr. for 20 hrs. in vacuum at room temperature. After the irradiation, the resulting homopolymer was removed by extraction with benzene. The graft percent defined by $$\left( \frac{\text{grafted polymer (g)}}{\text{silica gel (g)}} \times 100 \right)$$

was 25% which corresponds to 2.2 times the amount of styrene monomolecular layer. (calculated using 50 $Å^2$ as the sectional area of a styrene monomolecule.) The solid support was packed by a dry method in a column having a length of 1 ft. and a diameter of ⅛ inch. A mixture of aromatic compounds of benzene, naphthalene and anthracene was separated at room temperature by flowing methanol as the medium at a flow rate of 2.5 ml/min. under a pressure of 15 kg/cm². Detection was performed by ultraviolet rays having a wavelength of 254 mμm. The process was repeated except non-grafted silica gel was used instead of the grafted solid support. No separation was found in the case of the non-grafted silica gel, but the separation of benzene, naphthalene and anthracene was attained in the case of the grafted solid support.

EXAMPLE 2

7 g of methyl methacrylate monomer was adsorbed on 10 g of silica gel (specific area of 330 m²/g; average diameter of 20 - 25 μm) and γ-rays from a source of cobalt 60 were irradiated on the mixture at a dose rate of $10^5$ r/hr. for 6 hrs. in vacuum (or nitrogen atmosphere) at room temperature. After the irradiation, the resulting homopolymer was removed by extraction with acetone. The graft percentage of the product was 46% which corresponds to 4.2 times the amount of methyl methacrylate in a monomolecular layer. (calculated using 50 $Å^2$ as the sectional area of a methyl methacrylate monomolecule.) The solid support was packed in a column having a length of 30 cm and a diameter of 1 cm. A mixture of aromatic ketones of benzophenone, acetophenone and benzyl was separated at room temperature by flowing a medium of ethanol/water in a volume ratio of 85/15, at a flow rate of 2.5 ml/min. under a pressure of 25 kg/cm². Detection was performed by ultraviolet rays having a wavelength of 254 mμm. The process was repeated except nongrafted silica gel was used instead of the grafted solid support. No separation was found in the case of the nongrafted silica gel, but the separation of benzophenone, acetophenone and benzyl was attained in the case of the grafted solid support.

EXAMPLE 3

5 g of styrene monomer was adsorbed on 10 g of alumina (specific area of 160 m²/g; average diameter of 30 μm) and μ-rays from a source of cobalt 60 were irradiated on the mixture at a dose rate of $10^5$ r/hr. for 20 hrs. in vacuum at room temperature. After the irradiation, the resulting homopolymer was removed by extraction with benzene. The graft percentage of the product was 15% which corresponds to 2.7 times the amount of a styrene monomolecular layer. The solid support was packed in a column having a length of 30 cm and a diameter of 1 cm. A mixture of aromatic compounds of benzene, naphthalene, and anthracene was separated at room temperature by flowing methanol as the medium at a flow rate of 2.5 ml/min. under a pressure of 15 kg/cm². Detection was performed by ultraviolet rays having a wavelength of 254 mμm. The process was repeated except nongrafted alumina was used instead of the grafted solid support. No separation was found in the case of the nongrafted alumina, but the separation of benzene, naphthalene, and anthracene was attained in the case of the grafted solid support.

EXAMPLE 4

8 g of allylglycidyl ether monomer was adsorbed on 10 g of silica gel (specific area of 330 m²/g; average diameter of 20-25 μm), and γ-rays from a source of cobalt 60 were irradiated on the mixture at a dose rate of $10^5$ r/hr. for 16 hrs. in vacuum at room temperature. After the irradiation, the resulting homopolymer was removed by extraction with benzene, whereby a solid support having a graft percentage of 15% was produced. The graft percentage of the product was 15% which corresponds to 1.5 times the amount of an allylglycidyl ether monomolecular layer. (calculated using 50 $Å^2$ as the sectional area of allylglycidyl ether monomolecule.) The solid support was packed in a column having a length of 30 cm and a diameter of 1 cm. A mixture of methyl phthalate, ethyl phthalate and butyl phthalate was separated at room temperature by flowing a medium of methanol/water in a volume ratio of 70/30 at a flow rate of 2.5 ml/min. under a pressure of 15 kg/cm². Detection was performed by ultraviolet rays having a wavelength of 254 mμm. The process was repeated except nongrafted silica gel was used instead of the grafted solid support. No separation was found in the case of the nongrafted silica gel, but the separation of methyl phthalate, ethyl phthalate and butyl phthalate was attained in the case of the grafted solid support.

EXAMPLE 5

0.2 g of divinyl benzene and 2.5 g of acrylonitrile monomer were adsorbed on 10 g of silica gel (specific area of 330 m²/g; diameter of 20 - 25 μm), and γ-rays from a source of cobalt 60 were irradiated on the mixture at a dose rate of $10^5$ r/hr. for 16 hrs. in vacuum at room temperature. After the irradiation, the resulting homopolymer was removed by extraction with benzene. The graft percentage of the product was 25% which corresponds to 2.6 times the amount of an acrylonitrile monomolecular layer (calculated using 30 $Å^2$ as the sectional area of an acrylonitrile monomolecule.) The solid support was packed in a column having a length of 30 cm and a diameter of 1 cm. A mixtue of quinone, naphthoquinone and benzanthraquinone was separated at room temperature by flowing a medium of methanol at a flow rate of 2.5 ml/min. under a pressure of 15 kg/cm². Detection was performed by ultraviolet rays having a wavelength of 254 mμm. The process was repeated except nongrafted silica gel was used instead of the grafted solid support. No separation was found in the case of the nongrafted silica gel, but the separation of quinone, naphthoquinone and benzanthraquinone was attained in the case of the grafted solid support.

EXAMPLE 6

The grafted silica gel prepared in Example 1 was treated with 10% fuming sulfuric acid at 40° C for 60 minutes to introduce a sulfonic acid group. The resulting solid support had an ion-exchange capacity of 2.0 meq/g. The solid support was packed in a column having a length of 50 cm and a diameter of 4 mm. A mixture of amino acids was separated with a buffer solution of sodium citrate, at 45° C with a ph of 3.27 at a flow rate of 2 ml/min. under a pressure of 47 kg/cm², to give aspartic acid, threonine, serine, glutamic acid, glycine and alanine.

EXAMPLE 7

The degree of swelling of the solid supports prepared in Examples 1 and 2 were measured by using a medium of acetone or tetrahydrofuran. As references, the degrees of swelling of a nongrafted silica gel and polymer gel (polystyrene) were also measured. The results are shown in Table 2. The degree of swelling was calculated by the following equation: degree of swelling = swollen gel (ml)/dry gel (ml).

Table 2

| Solid support | Graft percent | Degree of Swelling acetone | THF |
|---|---|---|---|
| silica gel | — | 1.00 | 1.00 |
| styrene grafted product | 25% | 1.03 | 1.05 |
| methyl methacrylate grafted product | 46% | 1.05 | 1.05 |
| polymer gel | — | 1.7 | 2.0 |

As is clear from Table 2, the solid support of the invention had a quite low degree of swelling compared with that of the polymer gel.

EXAMPLE 8

The specific surface area of the solid supports prepared in Examples 1, 2, 4 and 5 were measured by the B.E.T. method. As a reference, the specific area of the nongrafted solid support was also measured. The results are shown in Table 3.

Table 3

| Solid support | Specific surface area ($m^2/g$) |
|---|---|
| silica gel | 330 |
| styrene grafted silica gel | 170 |
| methyl methacrylate grafted silica gel | 115 |
| allylglycidyl ether grafted silica gel | 230 |
| acrylonitrile grafted silica gel | 160 |

As it is clear from Table 3, the grafted solid supports had large specific surface areas.

EXAMPLE 9

18 g of methyl methacrylate monomer was adsorbed on 30 g of silica gel (specific area 480 $m^2/g$; size of 50 – 70 mesh) and γ-rays from a source of cobalt 60 were irradiated on the mixture at a dose rate of $10^5$ r/hr. for 5 hrs. in vacuum at room temperature. After the irradiation, the resulting homopolymer was removed by an extraction with acetone. The graft percentage of the product was 42%, which corresponds to 3.8 times the amount of a methyl methacrylate monomolecular layer. The solid support was packed in a column having a length of 1.9 m and a diameter of 3 mm. A separation of a mixture of methanol, ethanol, iso-propanol and n-propanol was performed with a carrier gas of helium at 100° C at a flow rate of 35 ml/min. When a nongrafted silica gel was used, the mixture was adsorbed on the silica gel, whereby no peak was detected. No separation was found in the case of the nongrafted silica gel, but the separation of methanol, ethanol, iso-propanol and n-propanol was attained in the case of the grafted solid support. FIG. 1 is a graph showing the relationship between the graft percentage of styrene and the specific area (A) of styrene grafted silica gel, and also the relationship between the graft percentage and the specific area (B) of grafted polystyrene prepared by removing the silica gel component with hydrofluoric acid. In FIG. 1, the ordinate shows the specific area and the abscissa shows the graft percentage (in the case of (B), the graft percentage of the product before removing silica gel). The specific surface area of polystyrene after removing silica gel was about 100 $m^2/g$. This is a high figure. This fact demonstrates that the shape of the grafted polymer replicated that of the ungrafted polymer and that the graft was performed in the fine holes of the silica gel.

Having now fully described the invention, it will be apparent to one of ordinary skill in the art that many changes and modifications can be made thereto without departing from the spirit or scope of the invention as set forth herein.

What is claimed and intended to be covered by letters patent is:

1. A chromatography solid support which is prepared by immersing a microporous inorganic substrate selected from the group consisting of silica, silica gel, alumina, diatomaceous earth, zeolite, porous glass, carbon black, active carbon and clay, which has an average specific surface area of 0.1 – 3000 $m^2/g$, an average pore diameter of 20 – 2000 Å and an average particle size of 1μm – 1 cm, in a radiation-polymerizable monomer selected from the group consisting of ethylenically unsaturated monomers, aldehydes, ketones and cyclic ethers, and subjecting the monomer, coated microporous inorganic substrate to a high-energy radiation to produce radiation-induced grafting of said polymerizable monomer onto said substrate to thereby bond said monomer onto said substrate, such as to produce polymer, a portion of which is grafted to said inorganic substrate, and a portion of which is not bonded to the inorganic substrate, the amount of grafter polymer per amount of inorganic substrate being defined by the equation;

$$A(g/\text{grams of inorganic substrate}) = (S \times m)/(a \times N)$$

wherein:
 $S$ = specific area of inorganic substrate ($m^2g$)
 $a$ = sectional area of one molecule of monomer ($Å^2$)
 $m$ = molecular weight of the monomer
 $N$ - Avogadro's number 2. The chromatography solid support according to claim 1, wherein a cross-linking agent is added before the radiation-induced polymerization.

3. The chromatography solid support according to claim 1, wherein a functional group is introduced in the polymer grafted onto said inorganic substrate.

4. The chromatography solid support according to claim 1, wherein the polymer which is not bonded to the inorganic substrate is removed by extracting it with a solvent.

5. The chromatography solid support according to claim 1, wherein said microporous inorganic substrate is a microporous inorganic support.

6. The chromatography solid support according to claim 1, wherein said microporous inorganic substrate is coated on a core.

7. The chromatography solid support according to claim 13, wherein said inorganic substrate has an average specific surface area of 0.1 – 3000 $m^2/g$.

8. A chromatography solid support which comprises a microporous solid inorganic substrate selected from the group consisting of silica, silica gel, alumina, diatomaceous earth, zeolite, porous glass, active carbon, carbon black and clay, having a polymer coating thereon, and having an average particle diameter of 1μm to 1 cm, an average specific surface area of 1 - 2000 m²/g, an average pore diameter of 10 to 1900 A, and having said polymer coating formed by immersing said substrate into a radiation polymerizable monomer selected from the group consisting of ethylenically unsaturated monomers, aldehydes, ketones and cyclic ethers, and thereafter exposing said monomer coated substrate to the activity of high energy ionizing radiation to produce radiation-induced grafting of said polymerizable monomer onto said substrate to thereby bond said monomer onto said substrate, such as to produce polymer, a portion of which is grafted to said inorganic substrate, and a portion of which is not bonded to the inorganic substrate, the amount of grafter polymer per amount of inorganic substrate being defined by the equation;

$$A(g/\text{grams of inorganic substrate}) = (S \times m)/(a \times N)$$

wherein:
$S$ = specific area of inorganic substrate (m²g)
$a$ = sectional area of one molecule of monomer (A²)
$m$ = molecular weight of the monomer
$N$ - Avogadro's number 9. The support of claim 8, wherein said average particle diameter is 2 - 50 μm.

10. The support of claim 8, wherein said average particle size is 30 to 120 mesh.

11. The support of claim 8, wherein said monomer is selected from the group consisting of styrene monomer, fluorine containing monomer, silicon containing monomer, acrylate, methacrylate, vinyl monomer, olefin monomer, diene monomer, aldehyde, ketone, and cyclic ether.

12. A method for forming a chromatography solid support which comprises immersing a microporous solid substrate selected from the group consisting of silica, silica gel, alumina, diatomaceous earth, zeolite, porous glass, carbon black, active carbon and clay, into a radiation polymerizable monomer selected from the group consisting of ethylenically unsaturated monomers, aldehydes, ketones and cyclic ethers, and thereafter exposing said monomer coated substrates to the activity of high energy ionizing radiation to produce radiation-induced grafting of said polymerizable monomer onto said substrate to thereby bond said monomer onto said substrate, wherein said support is characterized by an average particle diameter of 1μm to 1 cm, an average specific surface are of 1 - 2000 m²/g and an average pore diameter of 10 to 1500 A, such as to produce polymer, a portion of which is grafted to said inorganic substrate, and a portion of which is not bonded to the inorganic substrate, the amount of grafter polymer per amount of inorganic substrate being defined by the equation;

$$A(g/\text{grams of inorganic substrate}) = (S \times m)/(a \times N)$$

wherein:
$S$ = specific area of inorganic substrate (m²g)
$a$ = sectional are of one molecule of monomer (A²)
$m$ = molecular weight of the monomer
$N$ - Avogadro's number

* * * * *